Oct. 11, 1960

G. H. APPEL 2,955,377

FISHING LURE AND HOOK

Filed April 20, 1959

INVENTOR.
GERHARD H. APPEL
BY Cullen & Canton
ATTORNEYS

# United States Patent Office 2,955,377
Patented Oct. 11, 1960

2,955,377

FISHING LURE AND HOOK

Gerhard H. Appel, R.R. 1, Belle River, Ontario, Canada

Filed Apr. 20, 1959, Ser. No. 807,586

3 Claims. (Cl. 43—35)

This application relates to a fishing lure and hook. The conventional type of fishing lure generally is shaped like a fish or insect or the like and generally is connected at its head end to the fishing line which in turn is connected to the fishing pole. The lure is dragged through the water by the pole and in the case of trolling is dragged behind the boat from the line. The lure may have secured to it a fish hook or in the alternative the hook may be connected to the line directly with the hook curving back toward the direction of the line so that the bight of the hook faces away from the direction of pull on the line and the hook barbed or sharp end faced toward the line. At times, the lure may be turned backwards with the tail end connected to the line and the head end being free. But even here, the hook is arranged the same way.

If a fish swallows the lure, starting at the free end and swallowing in the direction of the line, then the hook will become lodged in his mouth and if the fish backs off the lure or attempts to escape, the hook will imbed itself deeply into the mouth.

However, I have discovered that certain types of fish do not swallow the lure from the free end toward the line, but rather swallow the lure from the head toward the tail, the head being the end that is going in the forward direction and leading the lure. These types of fish generally attack the lure as if it were its ordinary prey by slamming into it with their heads to stun the prey and then by circling about and swallowing the prey, or in this case the lure, from the head or pull end toward the tail or free end. In these cases, the fish advances towards the sharp end of the hook and upon encountering the hook, backs off the lure and escapes. Such fish are sometimes caught because the hook engages their gills or some other part of their bodies. But where the hook does not catch the gill or some part of the fish, the fish disgorges the bait or lure and escapes.

Thus, it is an object of this invention to form a lure which the fish can swallow head first and which has a hook means which secures itself in the mouth of the fish when the fish tries to disgorge the lure.

A further object of this invention is to provide a lure having a head end which travels forwardly and with a hook which points backwards and with the line connected to the hook so that the line may be pulled in the direction of sharp point of the hook and the lure may be pulled tail end first once a fish is caught, to thus securely catch the hook into its mouth.

These and other objects and advantages will become apparent upon reading the following description of which the attached drawings form a part.

With reference to the attached drawings, in which.

Figure 1:
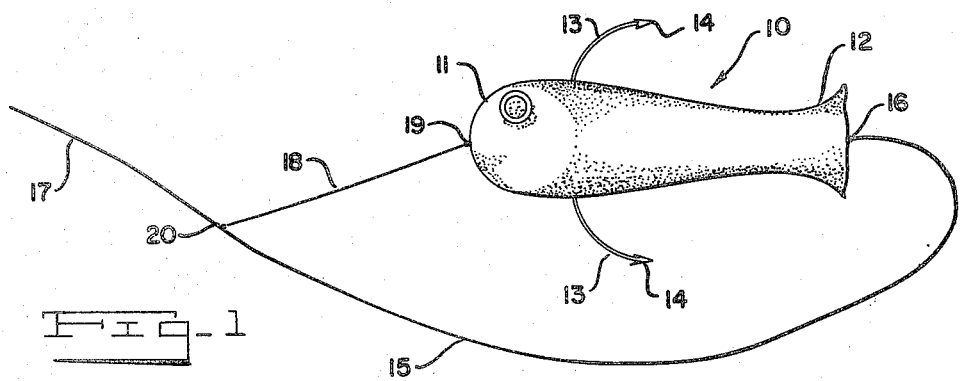
Fig. 1 is a view in elevation of a lure and hook.

The lure herein is formed of a body 10 which may be shaped like a small fish commonly used as bait and has a head end or forward end 11 a tail end or rear end 12. A line 15 is connected at one end to the tail end of the body at 16 and its opposite end 17 is secured to a support means such as a fishing pole or a boat, etc., wherein the line may be towed in the direction of the end 17.

A cord 18, formed of an easily breakable string, such as one that would break with five pounds or less pull, is connected at one end 19 to the head end of the lure and at its opposite end 20 to the line 15 forwardly of the lure. Note, that the line 15 is bent around so that it extends the length of the lure and extends forwardly of the head end of the lure. With the bend in the line, and with the easily breakable cord 18, there is a loop of line depending from the connection point 20 to the tail end 16 which thus hangs free below the lure while the lure is pulled through the water head first.

Figure 2:
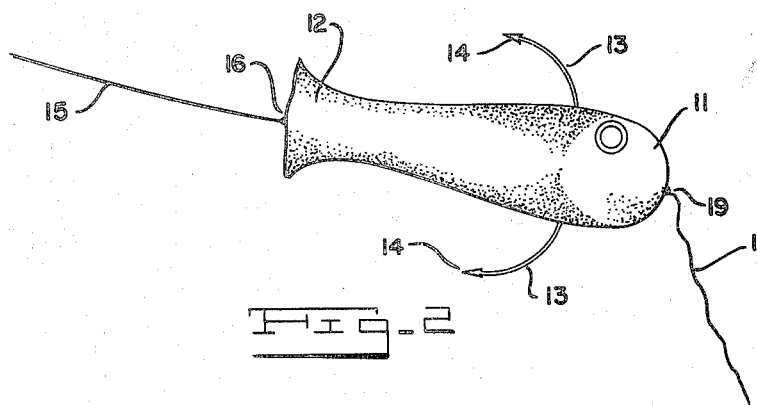
Fig. 2 shows the lure being pulled after being swallowed by a fish.

When a fish sees the lure, it will attack the lure either by striking it first and then swallowing it or by simply swallowing it head first. In swallowing the lure head first, the cord 18 breaks upon the force of the fish taking the lure and as the lure enters the fish's mouth. The hook 13, which is curved backwards so that its free end or sharp or barbed end 14 faces rearwardly, enters the fish's mouth easily. When the fish is caught, the line 15 is pulled so that the lure reverses itself and travels tail first (see Fig. 2) with the bar or sharp end imbedded in the fish's mouth. Likewise, should the fish attempt to disgorge the lure as happens many times, the sharp end 14 engages the fish's mouth and it cannot shake the hook free.

Thus, it can be seen that the fish lure normally travels head first through the water due to the cord 18, but upon being taken by a fish, travels tail first through the water with the hook 14 imbedded in the fish's mouth.

Modification

Figure 3:
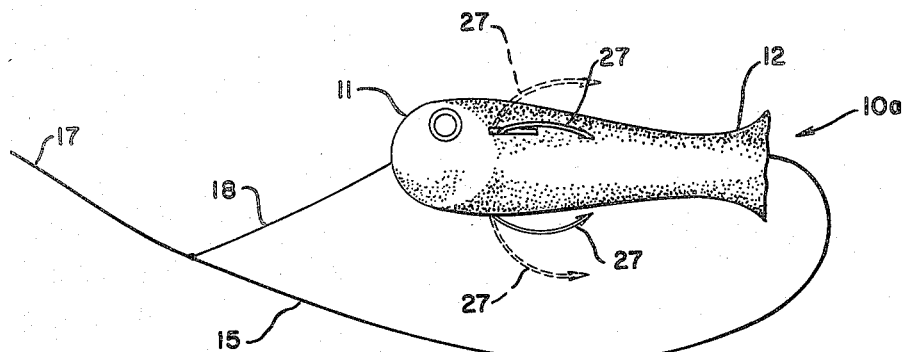
Fig. 3 is a modification.
Figure 4:
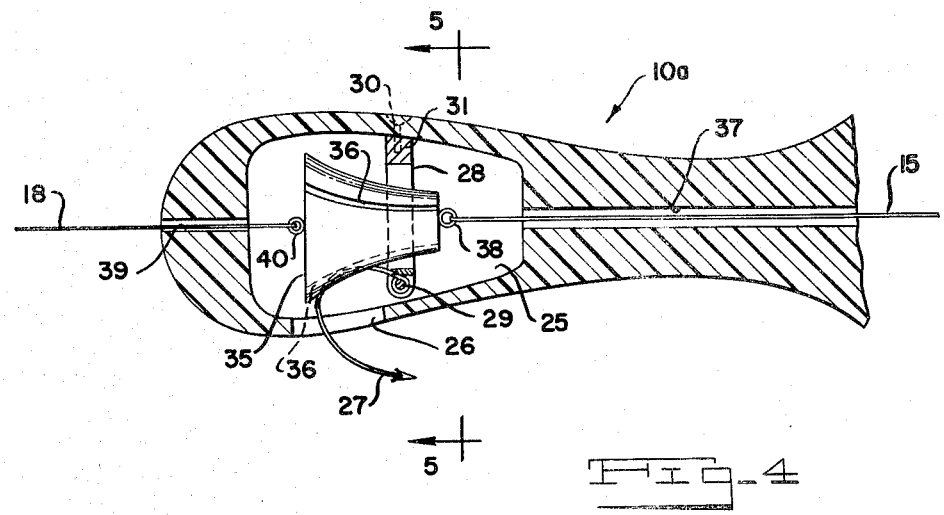
Fig. 4 is a cross-sectional, enlarged, view of the modification of Fig. 2.
Figure 5:
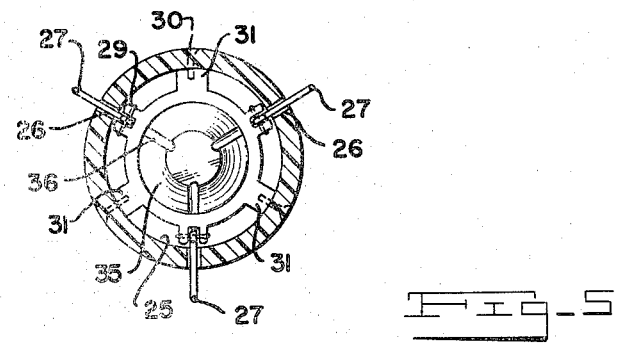
Fig. 5 is an enlarged cross-sectional view taken in the direction of arrows 5—5 of Fig. 4.

A modification is shown in Figs. 3–5 wherein the hook may be pivoted to more tightly secure itself in the fish's mouth. The body 10a is formed with a cavity 25 and slots 26 through which the hook, which may be formed of three sections 27, extends. Each hook section or prong is pivotally connected to a support ring 28 by pins 29. The ring is secured within the body cavity 25 by means of screws 30 entering bosses 31 which are integral with the ring. Thus, each hook section may pivot in a plane which is radial of the axis of the lure.

A bell shaped wedge 35 is fitted between the adjacent parts of the hook sections. The wedge is provided with channels 36 which each receive a hook section. The end of line 15 passes through passageway 37 and is connected to the tail end of the wedge at 38, and the end of line 18 passes through opening 39 and is connected to the head end of the wedge at 40.

When the lure is towed head first, the hook sections are retracted. But when a fish swallows it, breaking line 18, and the lure is then towed tail first, line 15 pulls the wedge towards the lure tail end, thus pivoting the hook prongs outwardly to more deeply bite into the fish's mouth and prevent it from escaping.

This invention may be further developed within the scope of the following attached claims. Accordingly, it is desired that the foregoing description be read as being merely illustrative of an operative embodiment of this invention and not in a strictly limiting sense.

I claim:

1. A fishing lure and hook comprising a body formed to resemble a fish having a head end and a tail end; a curved hook having one end secured to the body and an opposite sharp end with the hook curving from its body secured end towards the tail of the body and the sharp end extending towards said tail; means for towing the lure head first through water, said means comprising a fishing line having an end secured to the body and extending from the tail of the body along the body length past the head to a support means for pulling the line, and a short length of easily breakable cord having one end secured to the lure at the head thereof and its opposite end non-movably secured to the fishing line at a point well in front of said head, the cord normally being taut and that portion of the fishing line located between the tail of the body and the point of securement to the cord being normally in a loose, wide loop, so that a pull on the line at its support means end is transmitted through the line and through the cord to the head of the lure for pulling the lure head first through water, and whereby when a fish swallows the lure from the head towards the tail thereof, the cord breaks and the lure is then pulled tail first by the line only.

2. A fishing lure and hook comprising a body having a forward end and a rear end, the body being transversely slotted for the reception of a curved hook having at least two prongs, the prongs each having an inner end which is pivotally connected to the body within the slots and a sharp pointed end, the prongs each being curved from the forward end towards the rear end of the body and having their sharp pointed ends extending rearwardly, the prongs each being normally arranged substantially within the slots and being pivotally movable in a plane radial to the axis of the body for extending a maximum distance out of the slots; a wedge means inserted between the prong curved portions and being formed to wedge the prongs apart to thus pivot the prongs out of the slots upon movement of the wedge means towards the rear end of the lure, an opening extending in an axial direction the length of the body from the forward end to the rear end and a fishing line having an end secured to the rear end of the wedge and extending from the wedge through the opening out of the rear end of the body and arranged to pull the wedge rearwardly for wedging the prongs apart; an easily breakable cord extending through the opening from the forward end of the body to the wedge and having an end secured to the forward end of the wedge, the fishing line being normally bent into a loose, wide loop extending from the rear end of the body along the length of but widely spaced from the body and beyond the forward end of the body for connecting to a support means, and the opposite end of the cord being non-movably secured to the line well forward of the forward end of the body and the cord normally being taut whereby the line normally pulls the cord and thereby pulls and holds the wedge in a forward, non-wedging position, and pulls the lure forward end first through water, but when the lure is swallowed by a fish from the forward end to the rear end thereof, the cord breaks and the line then pulls the wedge towards the rear end of the body into a wedging position for pivoting the prongs and for pulling the lure rear end first through the water.

3. A construction as defined in claim 2 and wherein the lure is shaped like a small fish, with the forward end being formed to resemble the head of the fish and the rear end being formed to resemble the tail of the fish.

References Cited in the file of this patent
UNITED STATES PATENTS

| | | |
|---|---|---|
| 1,556,297 | Moore | Oct. 6, 1925 |
| 1,633,419 | Reed | June 21, 1927 |
| 2,445,461 | St. John | July 20, 1948 |